US012762342B2

(12) United States Patent
Angkititrakul et al.

(10) Patent No.: US 12,762,342 B2
(45) Date of Patent: Oct. 13, 2026

(54) SYSTEM AND METHOD FOR MULTI-CONDITIONED AUDIO GENERATION

(71) Applicant: Robert Bosch GmbH, Stuttgart (DE)

(72) Inventors: Pongtep Angkititrakul, Dublin, CA (US); Long Huang, Baton Rouge, LA (US); Samarjit Das, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 18/667,475

(22) Filed: May 17, 2024

(65) Prior Publication Data

US 2025/0356121 A1 Nov. 20, 2025

(51) Int. Cl.
*G06F 40/284* (2020.01)
*G10L 13/08* (2013.01)

(52) U.S. Cl.
CPC ............ *G06F 40/284* (2020.01); *G10L 13/08* (2013.01)

(58) Field of Classification Search
USPC ........................................................ 704/1–504
See application file for complete search history.

(56) References Cited

U.S. PATENT DOCUMENTS 11,562,744 B1 * 1/2023 Gao ...................... G10L 13/033
11,915,689 B1 * 2/2024 Agostinelli ............. G10L 13/00
12,020,138 B2 * 6/2024 Zeghidour .............. G10L 13/00
2020/0402497 A1 * 12/2020 Semenov ............... G06N 3/094
2023/0282202 A1 * 9/2023 Ahmed ................ G06N 3/0475
2023/0326158 A1 * 10/2023 Shayani .................. G06T 19/20 345/419
2024/0153259 A1 * 5/2024 Motiian ................. G06V 10/82
2025/0356121 A1 * 11/2025 Angkititrakul ....... G06F 40/284
2026/0030325 A1 * 1/2026 Horton .................. G06F 21/106

FOREIGN PATENT DOCUMENTS

EP 4651125 A1 * 11/2025 ............. G10L 13/08
WO WO-2026005910 A1 * 1/2026 ............. G06N 3/006

OTHER PUBLICATIONS

Yang, D., et al., "Diffsound: Discrete Diffusion Model for Text-to-sound Generation", IEEE/ACM Transations on Audio, Speech, and Language Proceeding, 2023, 14 pages retrieved from: https://arxiv.org/pdf/2207.09983.
Liu, H., et al., "AudioLDM: Text-to-Audio Generation with Latent Diffusion Models", arXiv preprint arXiv:2301.12503v3, Sep. 9, 2023, 25 pages.

(Continued)

*Primary Examiner* — Marcus T Riley
(74) *Attorney, Agent, or Firm* — Brooks Kushman, P.C.

(57) ABSTRACT

A method for audio generation includes defining an audio input condition for an obtained input using an encoder, where the obtained input is indicative of one or more audio characteristics. The method further includes defining an audio style condition of a selected audio style profile employing an audio feature extraction neural network, and outputting a generated audio data indicative of a desired generated audio using a multi-conditioned latent diffusion model that employs the audio input condition and the audio style condition as adapters to the multi-conditioned latent diffusion model.

17 Claims, 6 Drawing Sheets

(56) References Cited

OTHER PUBLICATIONS

Ghosal, D., et al., "Text-to-Audio Generation using Instruction-Tuned LLM and Latent Diffusion Model", arXiv preprint arXiv:2304.13731, May 29, 2023, 15 pages.
Radford, A., et al., "Learning Transferable Visual Models From Natural Language Supervision", Proceedings of the 38th International Conference on Machine Learning, PMLR 139, 2021, 16 pages.
Elizalde, B., et al., "CLAP: Learning Audio Concepts from Natural Language Supervision", IEEE International Conference on Acoustics, Speech and Signal Processing (ICASSP), 2023, 9 pages retrieved from: https://arxiv.org/pdf/2206.04769.
Zhao, S., et al., "Uni-ControlNet: All-in-One Control to Text-to-Image Diffusion Models", arXiv preprint arXiv:2305.16322v3, Oct. 29, 2023, 23 pages.
Huang, L., et al., "Composer: Creative and Controllable Image Synthesis with Composable Conditions", arXiv preprint arXiv:2302.09778v2, Feb. 22, 2023, 16 pages.
Zhang, L. and Agrawala, M., "Adding Conditional Control to Text-to-Image Diffusion Models", arXiv preprint arXiv:2302.05543v2, Nov. 26, 2023, 12 pages.
Mou, C., et al., "T2I-Adapter: Learning Adapters to Dig Out More Controllable Ability for Text-to-Image Diffusion Models", arXiv preprint arXiv:2302.08453v2, Mar. 20, 2023, 10 pages.
Rombach, R., et al., "High-Resolution Image Synthesis with Latent Diffusion Models", Proceedings of the IEEE/CVF Conference on Computer Vision and Pattern Recognition, 2022, 45 pages retrieved from: https://arxiv.org/pdf/2112.10752.

* cited by examiner

SYSTEM AND METHOD FOR MULTI-CONDITIONED AUDIO GENERATION

TECHNICAL FIELD

Aspects of the present disclosure are generally directed to systems and methods for generating audio data.

BACKGROUND

Text-to-audio (TTA) generation systems can employ different models for generating audio based on a text prompt from a user. In a non-limiting example, diffusion models learn discrete frequency spectrograms from audio samples in association with text prompts paired with the audio samples. Most TTA generation systems generate audio based on a text prompt that can describe the desired characteristics of the generated audio.

SUMMARY

In one form, the present disclosure is directed to a method for audio generation. The method includes defining an audio input condition for an obtained input using an encoder, where the obtained input being indicative of one or more audio characteristics. The method further includes defining an audio style condition of a selected audio style profile employing an audio feature extraction neural network, and outputting a generated audio data indicative of a desired generated audio using a multi-conditioned latent diffusion model that employs the audio input condition and the audio style condition as adapters to the multi-conditioned latent diffusion model.

In one form, the present disclosure is directed to a system for multi-conditional audio generation. The system includes one or more hardware computing devices configured to define an audio input condition for an obtained input using an encoder, the obtained input being indicative of one or more audio characteristics; define an audio style condition of a selected audio style profile employing an audio feature extraction neural network; and output a generated audio data indicative of a desired generated audio using a multi-conditioned latent diffusion model that employs the audio input condition and the audio style condition as adapters to the multi-conditioned latent diffusion model.

In one form, the present disclosure is directed to a non-transitory computer-readable medium comprising instructions for a multi-conditional audio generation system that, when executed by one or more hardware computing devices cause the one or more hardware computing devices to perform operations including to: define an audio input condition for an obtained input using an encoder, the obtained input being indicative of one or more audio characteristics; define an audio style condition of a selected audio style profile employing an audio feature extraction neural network; and output a generated audio data indicative of a desired generated audio using a multi-conditioned latent diffusion model that employs the audio input condition and the audio style condition as adapters to the multi-conditioned latent diffusion model.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Text-to-audio (TTA) systems may be used to synthesize audio content from textual descriptions. Synthesized audio content may be employed in various applications, such as but not limited to, training equipment diagnostic systems that use sound as an input to diagnose anomalies and/or wear and tear; training medical diagnostic systems that employ sound, such as a heartbeat, breathing, cough, and/or voice of a patient to diagnose health issues of the patient; and/or generating audio used in cinema and/or video games. An audio generation system generally receives a textual description descriptive of the desired audio when generating the audio. However, use of a text prompt alone may limit a user's ability to control specific features of the audio.

In one form, as detailed herein, the present disclosure is directed to approaches for outputting generated audio using a multi-conditioned latent diffusion model that is trained to generate audio using multiple control conditions. In a non-limiting example, inputs indicative of one or more audio characteristics, include an audio input condition, such as a textual prompt and an audio style condition of a selected audio style profile constructed using an audio feature extraction neural network. The multi-conditioned latent diffusion model is configured to output generated audio data indicative of a desired generated audio using the audio input condition and the audio style condition. In some forms, the multi-conditioned latent diffusion model of the present disclosure is further configured to manipulate a selected original audio to include a selected audio style profile. Accordingly, the disclosed approach accepts one or more control conditions along with a text prompt to enable flexible and controlled audio generation.

Figure 1:
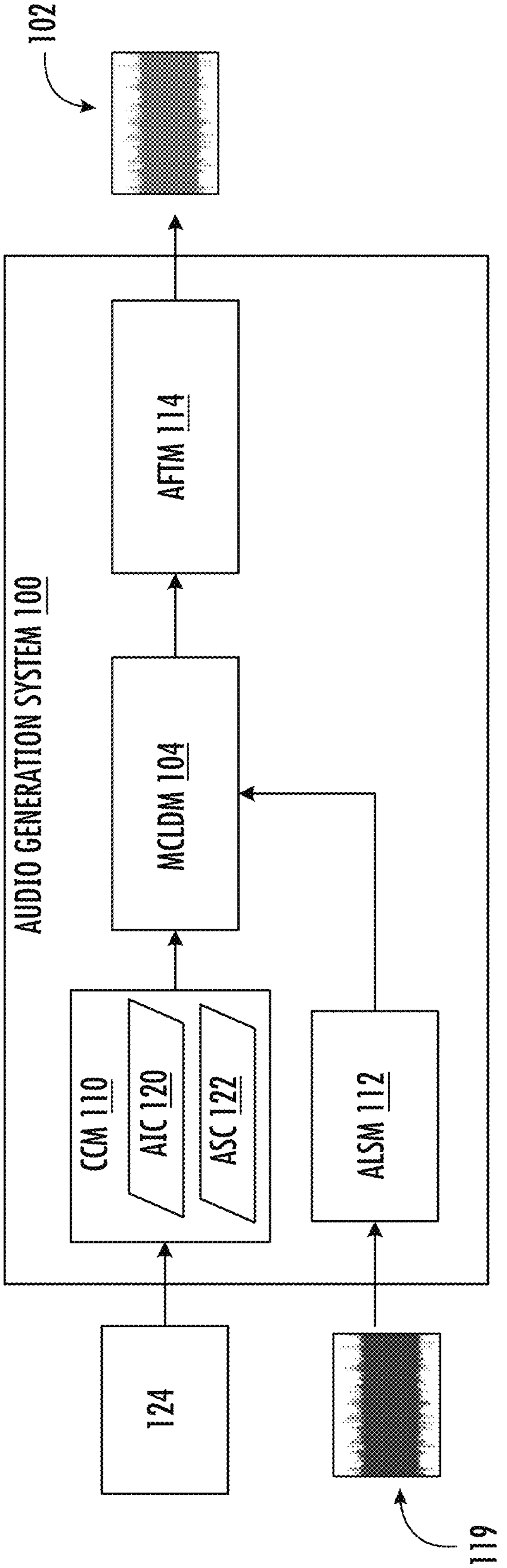
FIG. 1 is an example block diagram of an audio generation system.

Referring to FIG. 1, an audio generation system 100 of one form of the present disclosure is configured to output generated audio data 102 or, stated differently, a generated audio file indicative of a desired generated audio (e.g., desired generated audio 102) based on one or more selected conditions and a multi-conditioned latent diffusion model (MCLDM 104). In one form, the audio generation system 100 includes a control condition module (CCM) 110, an audio latent spatial module (ALSM) 112, the MCLDM 104, and an audio frequency transformation module (AFTM) 114.

As detailed herein, the MCLDM 104 employs a latent diffusion model that is trained for text-to-audio generation, such as generating audio based on multiple controls including audio input conditions (e.g., text embedding and audio embedding), and audio style condition indicative of an audio style feature to be incorporated in the desired generated audio 102. In one form, MCLDM 104 is configured to not only generate new audio based on the control condition, but also to manipulate an original audio file (or original audio data) 119 to incorporate the control conditions, such as the audio style condition.

The CCM 110 is configured to define control conditions, such as an audio input condition 120 and an audio style condition 122, that are employed by the MCLDM 104 to generate a desired audio latent space indicative of the generated audio data 102. Once trained, the CCM 110 may receive an audio generation input 124 indicative of one or more audio characteristics (e.g., one or more desired audio characteristics) for the desired generated audio 102. In a non-limiting example, the desired audio characteristics may indicate a category of a base sound for the desired generated audio 102 (e.g., sound of an electric motor, sound of a heartbeat, or sound of a cat), an audio style to be provided with the base sound (e.g., a squeak, a humming sound, an arrhythmia, or a buzzing sound). The audio generation input 124 may be provided as a text input string (e.g., a text prompt) describing the based audio and/or audio style and, in some instances, an audio sample of the base sound and/or the audio style.

Using the audio generation inputs 124, the CCM 110 defines the audio input condition 120 and the audio style condition 122. The CCM 110 may employ a trained text-to-audio model to extract text embedding and audio embeddings associated with audio samples that align with the text embedding. The audio samples may include one or more base sound, one or more audio styles, and/or combination of base sound and audio styles.

Figure 2:
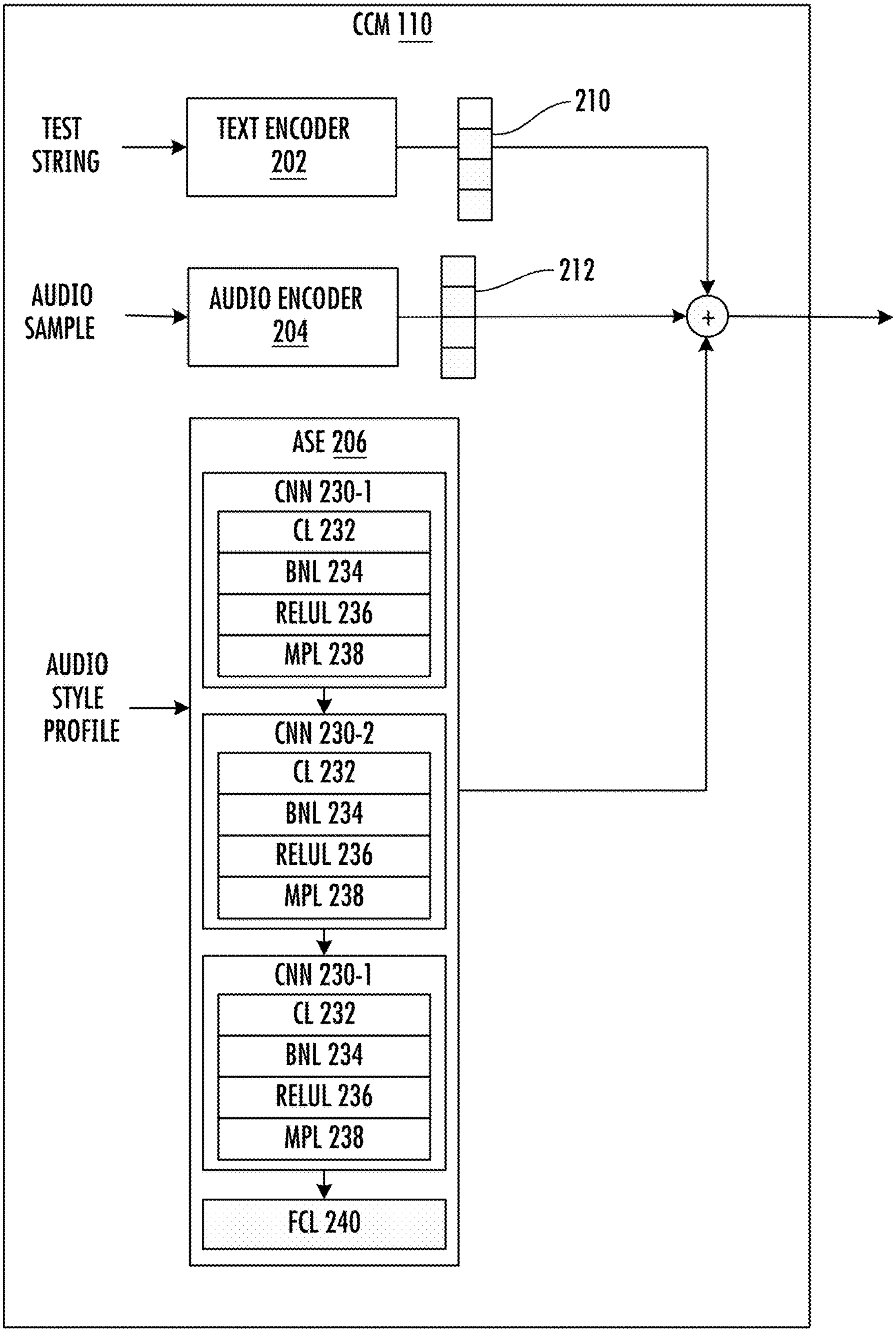
FIG. 2 is an example block diagram of a condition control module of the audio generation system of FIG. 1.

FIG. 2 is an example block diagram of the CCM 110. Referring to FIG. 2, and with continued reference to FIG. 1, the CCM 110 may include a text encoder 202, an audio encoder 204, and an audio style extractor (ASE) 206.

The text encoder 202 is configured to extract text embeddings 210 from the text string received, and the audio encoder 204 is configured to extract audio embeddings 212 associated with the text embeddings 210 or, if available, may also extract audio embeddings of an audio sample obtained as part of the audio generation input 120, if available. In one form, the text encoder 202 and the audio encoder 204 are provided as contrastive language-audio pretraining (CLAP) models that learn audio and text description in a joint multimodal space where the text embedding 210 and the audio embedding 212 each include audio and text information. In a non-limiting example, the text encoder 202 is designed using a robustly optimized bidirectional encoder representation approach (ROBERTa), and the audio encoder 204 is designed using a hierarchical token semantic audio transformer (HTSAT) type technique. The text encoder 202 and/or the audio encoder 204 may be configured in other suitable ways.

The ASE 206 is configured to define the audio style condition 122 of a selected audio style profile that is associated with the text input string or alternatively, is provided as part of the audio generation input 120. In a non-limiting example, if the text string includes a term associated with the audio style such as "squeak," an audio style profile of an audio sample associated with "squeak" is used to define the audio style condition 122. In one form, the ASE 206 is defined using a shallow convolutional neural network to define the audio style condition 122 of the selected audio style profile, where the selected audio style profile is provided as a spectrogram.

In one form, the ASE 206 includes three convolutional neural networks (CNN) 230-1, 230-2, 230-3 (collectively CNN 230) arranged successively, where each CNN 230 includes a convolutional layer (CL) 232, a batch normalization layer (BNL) 234, a rectified linear unit layer (ReLUL) 236, and a max pooling layer (MPL) 238. The ASE 206 further includes a fully connected layer (FCL) 240 that outputs the audio style condition 122. The ASE 206 receives a spectrogram indicative of the selected audio style profile that is generated using short-time Fourier transform of the selected audio style profile. The CNNs 230 are configured to extract audio characteristics of the audio style profile, where the audio characteristics is a texture or style of the audio (e.g., characteristics such as pitch, frequency, or other characteristics that relate to a squeak, a hum, or buzz provided). In one form, a shadow CNN is trained to discern and extract significant high-level features that serve as markers of various audio styles. The trained shadow CNN, as the ASE 206, is able to automatically extract stylistic information from audio samples by identifying the extracted features.

In one form, the ALSM 112 is configured to transform a selected audio input to a latent space provided as an audio sample latent space using an encoder. In a non-limiting example, the ALSM 112 is configured to use a pretrained variational auto-encoder (VAE) to encode a frequency-spectrogram indicative of the selected audio input into the latent space. The audio sample latent space of the selected input is then provided to the MCLDM 104 for diffusion and in some implementations, for manipulation of the audio input, as detailed herein.

Figure 3:
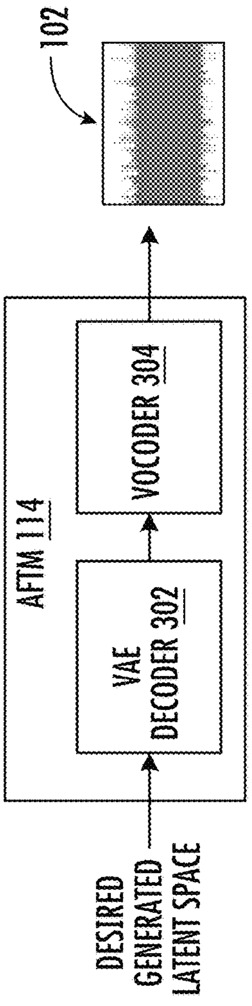
FIG. 3 is an example block diagram of an audio frequency transformation module of the audio generation system of FIG. 1.

FIG. 3 is an example block diagram of the AFTM 114 of the audio generation system. Referring to FIG. 3, the AFTM 114 is configured to transform the audio conditioned latent space to a frequency-spectrogram representing the generated audio data. In one form, the AFTM 114 is configured to include a VAE decoder 302 and a vocoder 304. The VAE decoder 302 is configured to decode the audio conditioned latent space from the MCLDM 104 to a frequency-spectrogram, and the vocoder 304 constructs an audio file from the frequency spectrogram. In a non-limiting example, the VAE decoder 302 and the vocoder 304 are based on the decoder and a high fidelity generative adversarial networks (HiFi-GAN) employed with audio latent diffusion models, respectively.

Figure 4:
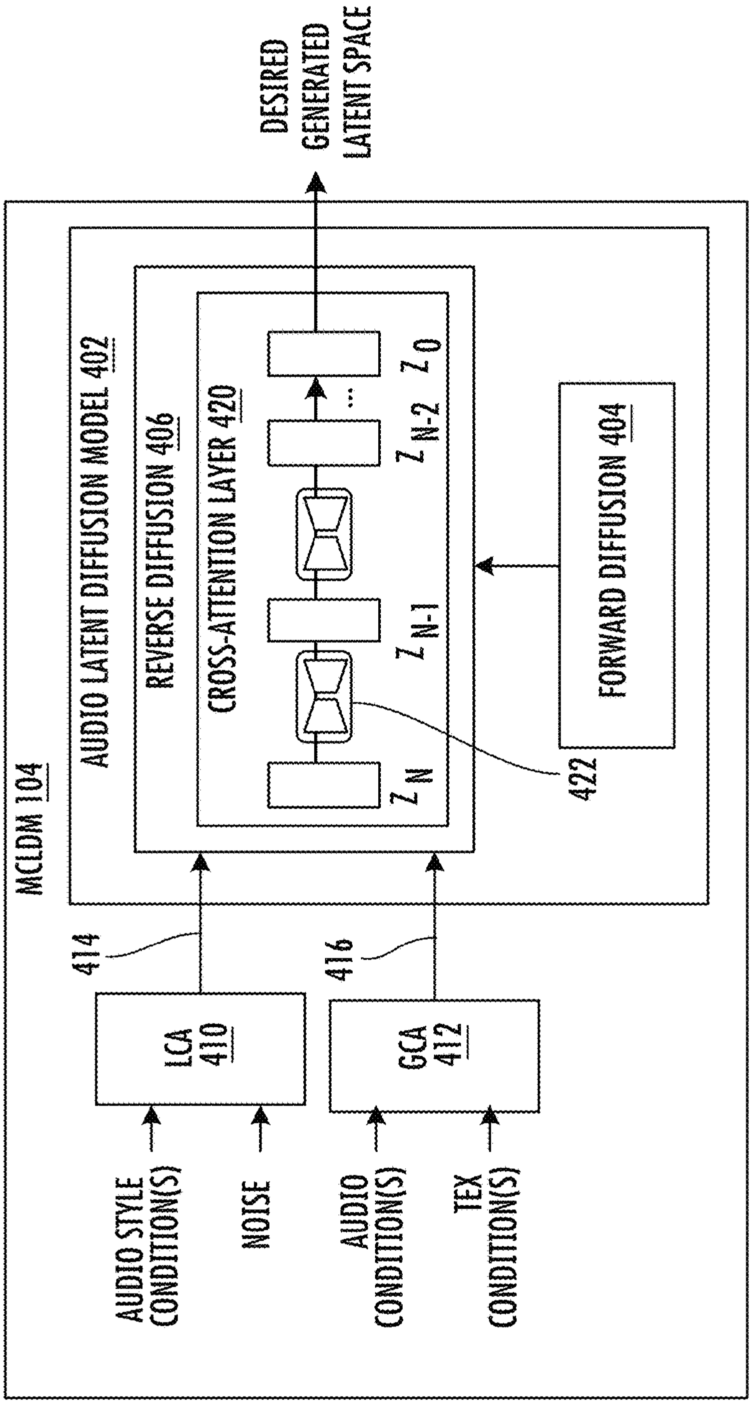
FIG. 4 is an example block diagram of a multi-conditioned latent diffusion model of the audio generation system of FIG. 1.

FIG. 4 is an example block diagram of the MCLDM 104 of the audio generation system. Referring to FIG. 4, in one form, the MCLDM 104 is configured to include an audio latent diffusion model 402 having, at least, a forward diffusion portion 404 and a reverse diffusion portion 406. Generally, the forward diffusion portion 404 is configured to transform the latent space from, for example, the ALSM 112, to a standard Gaussian distribution with a predefined noise schedule defined to inject noise in multiple steps (e.g., N-steps). Starting from the standard Gaussian distribution and from the text embeddings 210, the reverse diffusion portion 406 is configured to denoise the standard gaussian distribution to generate an audio conditioned latent space indicative of the generated audio data of the desired generated audio.

In one form, to generate a manipulated audio for a selected original audio data, the ALSM 112 is configured to provide the audio sample latent space to the forward diffusion portion 404, which adds the noise based on the noise schedule, and the reverse diffusion portion 406 is configured to change the audio sample latent space based on the audio style condition 122 that is selected based on, at least, the audio generation input 124.

The reverse diffusion portion 406 is configured to output a desired generated audio latent space indicative of the desired generated audio 102 using the audio input condition 120 (e.g., text embedding and/or audio embedding) and the audio style condition 122 as adapters to the audio latent diffusion model 402. Specifically, the MCLDM 104 includes a local condition adapter (LCA) 410 and a global condition adapter (GCA) 412 that are configured to define local controls 414 and global controls 416, as multi-conditioned controls, to the reverse diffusion portion 406. In a non-limiting example, the LCA 410 and the GCA 412 are formed using a unified controlled neural network (e.g., Uni-ControlNet) technique.

In one form, the audio style features defined by the audio style condition 122 are used as local control condition to define the local controls 414. Specifically, the LCA 410 is configured to modulate noise with the audio style condition 122 (e.g., audio characteristics) from the ASE 206. The audio conditions provided by the CCM 110 are used as global control conditions to generate the global controls. That is, the GCA 412 is configured to define a set of audio tokens (e.g., K number of tokens) based on the audio conditions indicative of the audio embeddings and a set of text tokens based on the text embeddings. The GCA 412 is configured to concatenate the set of audio tokens with the text tokens to generate a set of new prompt inputs that are used as global controls for the audio latent diffusion model 402, such as the reverse diffusion portion 406.

In one form, the reverse diffusion portion 406 includes cross-attention layers 420 to identify semantic information of the text string and is configured to process an audio isotropic Gaussian noise by performing N sampling steps to generate audio features (Z). That is, FIG. 4 illustrates audio features Z from $Z_0$ to $Z_N$, where $Z_0$ represent the latent vector associated with the desired generated audio latent space and $Z_N$ is the noisy latent space (e.g., isotropic Gaussian distribution). Trained de-noising networks 422 remove the noise from $Z_N$ to obtain the desired generated latent space Z according to an inference noise schedule.

In one form, the global control serves as the input to all of the cross-attention layers 420, and the local control is concatenated along the channel dimension and then condition features are extracted at different resolutions using a feature extractor. The reverse diffusion portion 406 may be trained with predicted noises that include text condition, audio condition, and audio style conditions. During generation of the desired generated audio, the audio features may be sampled with noise estimation modified using the audio generation input 124.

The LCA 410 is configured to identify and refine nuanced attributes of an audio signal, focusing on the modification of style or texture elements such as, but not limited to, timbre, rhythm, and the presence of unique sounds like squeaks or cracks. LCA 410 focuses on the fine details, allowing for precise adjustments within the audio landscape. On the other hand, the GCA 412 is configured to take a broader view, concentrating on the overarching qualities that characterize the audio. The GCA 412 deals with the semantic content or distinctive signatures that categorize different types of sounds, such as, but not limited to, the mechanical churn of a pump or the rhythmic pattern of breathing. This holistic approach ensures that the audio's general essence and type are accurately represented and maintained.

When manipulating a selected original audio data ($x_0$), the MCLDM 104 transforms the audio data to obtain a noisy latent space using the forward diffusion portion 404. The noisy latent space is then used as the starting noise feature in the reverse diffusion portion 406 conditioned on different manipulation controls. The selected original audio may be manipulated to transfer style characteristics identified as part of the audio generation input 124 to the selected original audio data.

By using the audio generation input 124, a user may adjust noise and audio style to be used in generating a desired audio. For example, in some forms, to modify a noise profile of the selected original audio data, the user may provide, as the audio generation input 124, a text prompt and/or a reference audio sample.

Figure 5:
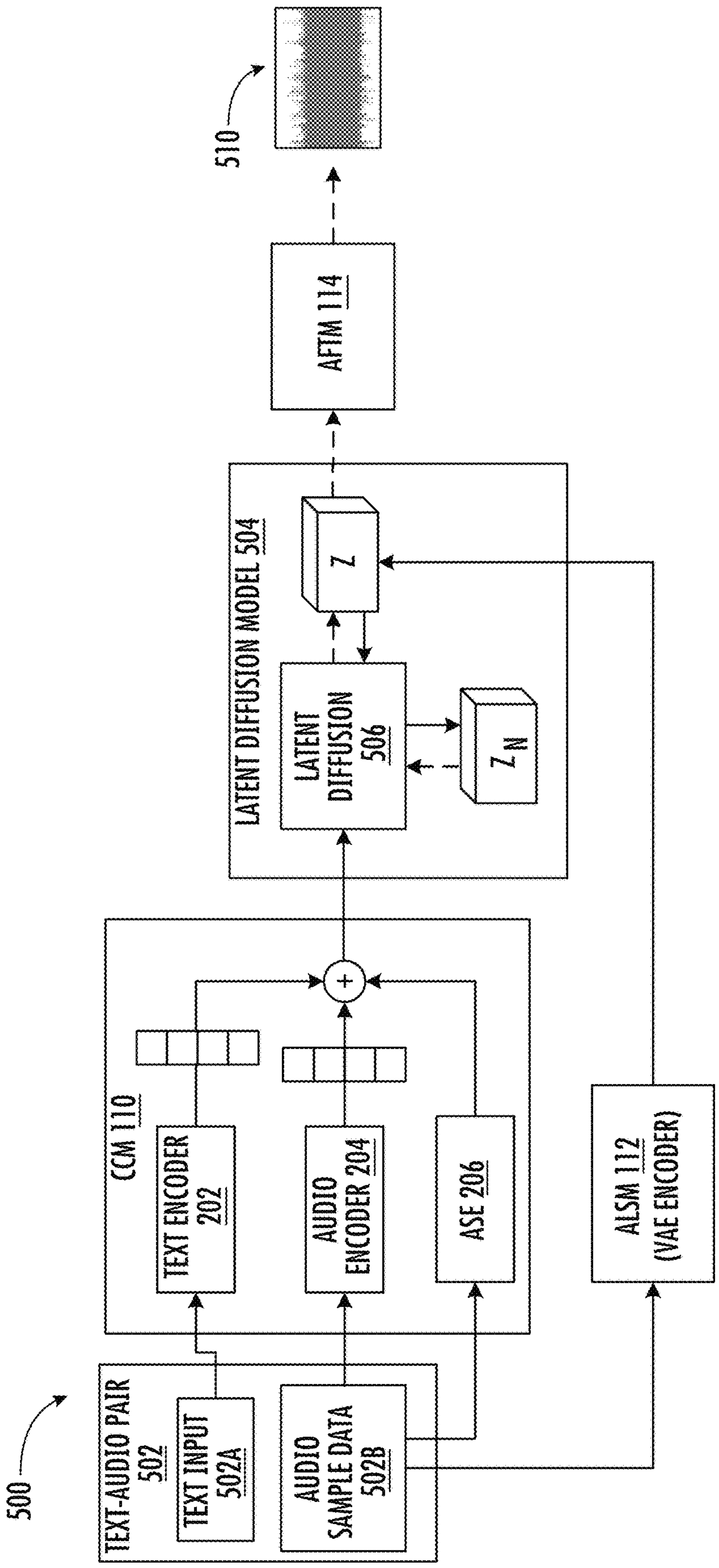
FIG. 5 is an example block diagram of a training process of the multi-conditioned latent diffusion model of FIG. 4.

Referring to FIG. 5, an example training system 500 for the MCLDM 104 is provided. The CCM 110 is configured to receive text-audio pairs 502 that include text input 502A and audio sample data 502B provided to the audio encoder 204, the ASE 206, and to the ALSM 112. The CCM 110 is configured to define the text condition, the audio condition, and the audio style condition 122 which are provided to a latent diffusion model 504 having a latent diffusion portion 506. In FIG. 5, the solid lines illustrate training process of the latent diffusion model 504 and the dashed line represents the generation of an audio data 510 during training.

The latent diffusion portion 506 may be trained to generate audio latent space using the audio embedding of the audio input condition 120 as global control condition that is concatenated with one or more text tokens associated with the text condition and using the audio style condition 122 as a local control condition. In a non-limiting example, when jointly training the latent diffusion model 504 with different combinations of conditions, an independent dropout rate of 0.5 is set for each condition, a probability of 0.1 is set for dropping all conditions, and a probability of 0.1 is set for retraining all conditions. By doing so, the latent diffusion model 504 may learn to generate audio with no condition, one condition, or multiple conditions. While specific values are provided for the independent dropout rate and probability for training the latent diffusion model 504, the values for hyperparameters may require careful adjustment and are contingent upon the specific dataset and application at hand.

Figure 6:
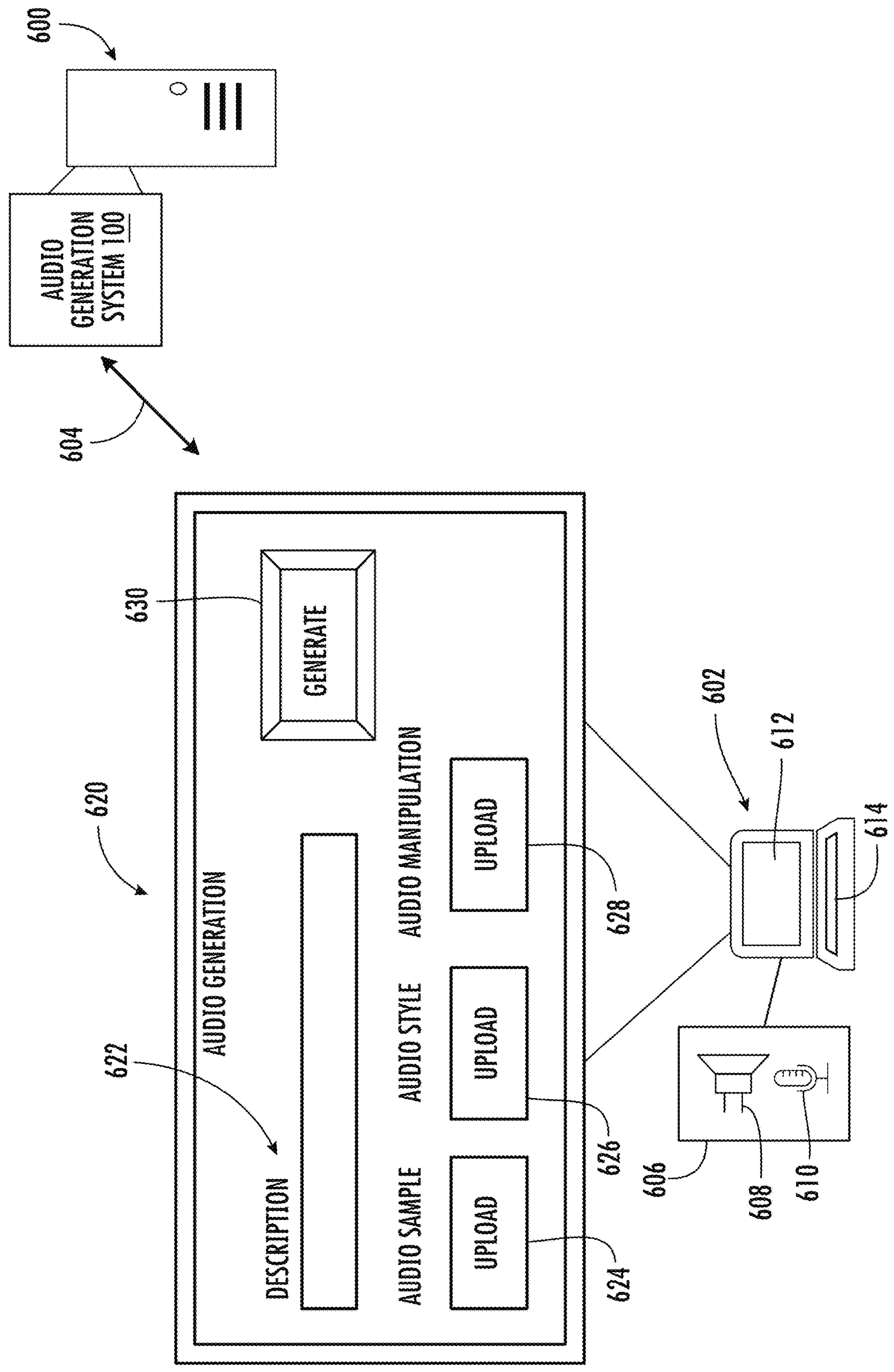
FIG. 6 is an example application of the audio generation system.

The audio generation system 100 of the present disclosure may be implemented in various suitable ways. In a non-limiting example, referring to FIG. 6, the audio generation system 100 is provided as part of cloud-based server 600 configured to communicate with a computing device 602 via wireless communication link 604. Non-limiting examples of the computing device 602 include a laptop, tablet, smartphone, and/or desktop computer. Among other components, the computing device 602 may include an audio system 606 having a speaker 608 and a microphone 610, a monitor 612 for displaying information, and a keyboard 614 for receiving user inputs.

In one form, the audio generation system 100 is accessible via a web-based interface and the system 100 may display one or more graphical interfaces that allow the user to use the features of the audio generation system. For example, a graphical interface 620 includes a description field 622 to receive a text string, and buttons 624, 626, and 628 to upload audio such as an audio sample, audio style, and an original audio to be manipulated, respectively. The user may then operate a command button 630 to provide the information entered and/or uploaded to the audio generation system 100, as the audio generation input 124. The audio generation system 100 generates the audio data indicative of a desired generated audio, and provides the generated audio data to the computing device 602. The computing device 602 may play the desired generated audio using the audio system 606. The computing device 602 may also store the generated audio data in a memory device of the computing device 602.

In another example, at least some of the features of the audio generation system 100 may be stored on the computing device 602, and thus, the audio generation system 100 may be distributed among multiple devices configured to process computer readable instructions. For example, the audio generation system 100 may include an audio generation software application that is stored and executed by the computing device 602 to generate the desired audio locally at the computing device 602. The audio generation system 100 may routinely receive data regarding the use of the audio generation application to further improve the MCLDM 104, and may provide updates to the audio generation application.

While specific implementations of the audio generation system 100 is provided herein, the audio generation system 100 may be implemented in other suitable ways and should not be limited to the disclosure herein.

Figure 7:
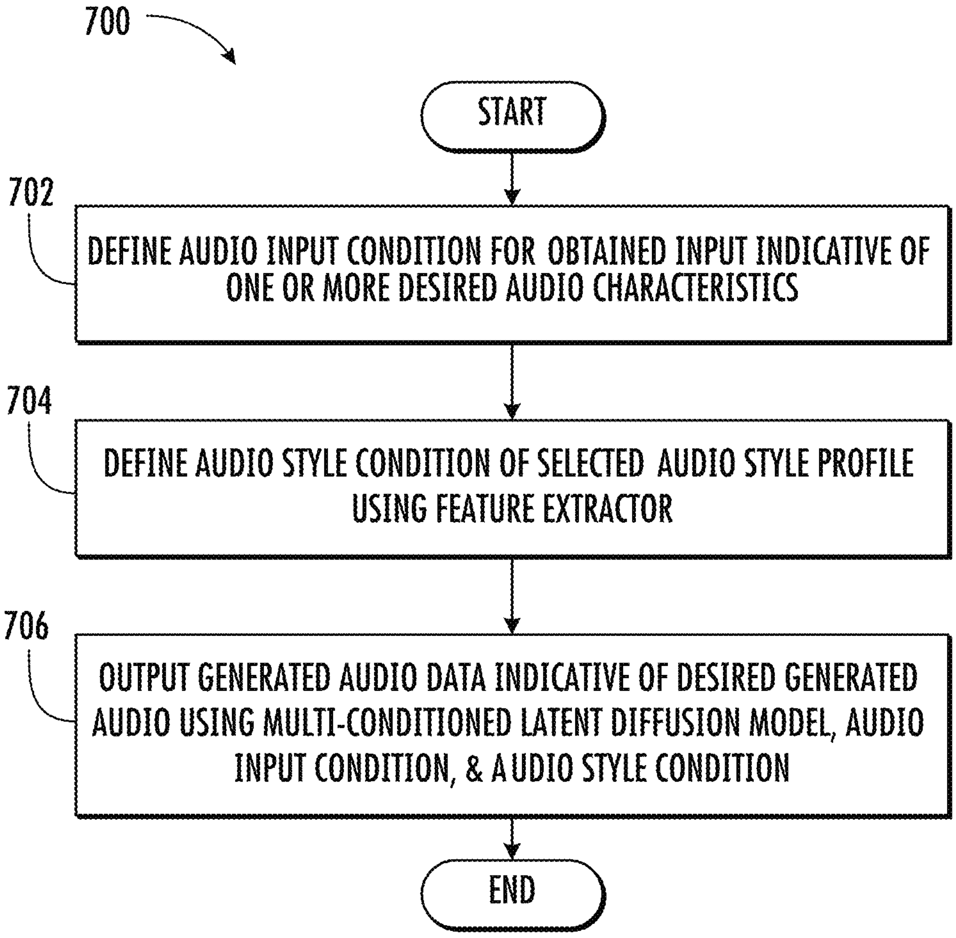
FIG. 7 is a flowchart of an example audio generation routine executed by the audio generation system of FIG. 1.

In one form, referring to FIG. 7, an example audio generation routine 700 executed by the audio generation system 100. At operation 702, the system 100 is configured to define audio input condition for an obtained input that is indicative of one or more desired audio characteristics. In one form, the audio input condition is defined using, at least, an encoder. At operation 704, the system 100 defines an audio style condition of a selected audio style profile, where the audio input condition is defined using a feature extractor such as an audio feature extraction neural network. At operation 706, the system 100 outputs a generated audio data indicative of a desired generated audio using a multi-conditioned latent diffusion model, the audio input condition, and the audio style condition. In one form, the audio input condition and the audio style condition are defined as adapters to the multi-conditioned latent diffusion model.

In a non-limiting example, the audio generation system 100 may include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory or memory circuit may be a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read only circuit), volatile memory circuits (such as a static random access memory circuit or a dynamic random access memory circuit), magnetic storage media (e.g., an analog or digital magnetic tape or a hard disk drive), and optical storage media (e.g., a USB, CD, a DVD, or a Blu-ray Disc).

The audio generation system 100 described in this application may be partially or fully implemented by a special purpose computer created by configuring a general-purpose computer to execute one or more particular functions embodied in computer programs. Components employed for the audio generation system 100 may be provided in a single device or may be distributed among multiple devices that are in communication using wireless communication (e.g., cellular network, WiFi network, BLUETOOTH, among others) and/or wired communication.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for audio generation, comprising defining an audio input condition for an obtained input using an encoder, the obtained input being indicative of one or more audio characteristics;

defining an audio style condition of a selected audio style profile employing an audio feature extraction neural network; and outputting a generated audio data indicative of a desired generated audio using a multi-conditioned latent diffusion model that employs the audio input condition and the audio style condition as adapters to the multi-conditioned latent diffusion model, the multi-conditioned latent diffusion model being trained using the audio style condition as a local control condition and the audio input condition as a global control condition concatenating with one or more text tokens associated with a text condition.

2. The method of claim 1, further comprising:

defining, by the multi-conditioned latent diffusion model, an audio conditioned latent space indicative of the generated audio data; and transforming the audio conditioned latent space to a frequency-spectrogram representing the generated audio data using a decoder.

3. The method of claim 1, wherein the audio input condition includes the text condition defined based on a text input string provided as part of the obtained input and an audio condition, wherein the audio condition is associated with the text input string or based on an audio sample.

4. The method of claim 1, wherein the multi-conditioned latent diffusion model is at least partly defined as a text to audio generation model conditioned using a plurality of condition including text embedding, audio embedding, and style control condition.

5. The method of claim 1, wherein the audio feature extraction neural network is defined using a shallow convolutional neural network to identify and define the audio style condition of the selected audio style profile.

6. The method of claim 1, further comprising:

transforming a selected original audio data to a latent space provided as an audio sample latent space using the encoder, and changing, by the multi-conditioned latent diffusion model, the audio sample latent space based on the audio style condition, wherein the generated audio data is indicative of the selected original audio data and the selected audio style profile.

7. A system for multi-conditional audio generation comprising:

one or more hardware computing devices configured to:

define an audio input condition for an obtained input using an encoder, the obtained input being indicative of one or more audio characteristics;

define an audio style condition of a selected audio style profile employing an audio feature extraction neural network; and output a generated audio data indicative of a desired generated audio using a multi-conditioned latent diffusion model that employs the audio input condition and the audio style condition as adapters to the multi-conditioned latent diffusion model, wherein the multi-conditioned latent diffusion model is trained using the audio style condition as a local control condition and the audio input condition as a global control condition concatenating with one or more text tokens associated with a text condition.

8. The system of claim 7, wherein the one or more hardware computing devices is further configured to:

define, using the multi-conditioned latent diffusion model, an audio conditioned latent space indicative of the generated audio data; and transform the audio conditioned latent space to a frequency-spectrogram representing the generated audio data using a decoder.

9. The system of claim 7, wherein the audio input condition includes the text condition defined based on a text input string provided as part of the obtained input and an audio condition, wherein the audio condition is associated with the text input string or based on an audio sample.

10. The system of claim 7, wherein the multi-conditioned latent diffusion model is at least partly defined as a text to audio generation model conditioned using a plurality of condition including text embedding, audio embedding, and style control condition.

11. The system of claim 7, wherein the audio feature extraction neural network is defined using a shallow convolutional neural network.

12. The system of claim 7, wherein the one or more hardware computing devices is further configured to:

transform a selected original audio data to a latent space provided as an audio sample latent space using the encoder, and change, using the multi-conditioned latent diffusion model, the audio sample latent space based on the audio style condition, wherein the generated audio data is indicative of the selected original audio data and the selected audio style profile.

13. A non-transitory computer-readable medium comprising instructions for a multi-conditional audio generation system that, when executed by one or more hardware computing devices cause the one or more hardware computing devices to perform operations including to:

define an audio input condition for an obtained input using an encoder, the obtained input being indicative of one or more audio characteristics;

define an audio style condition of a selected audio style profile employing an audio feature extraction neural network; and output a generated audio data indicative of a desired generated audio using a multi-conditioned latent diffusion model that employs the audio input condition and the audio style condition as adapters to the multi-conditioned latent diffusion model, wherein the multi-conditioned latent diffusion model is trained using the audio style condition as a local control condition and the audio input condition as a global control condition concatenating with one or more text tokens associated with a text condition.

14. The non-transitory computer-readable medium of claim 13, wherein the instructions further cause the one or more hardware computing devices to perform operations including to:

define, using the multi-conditioned latent diffusion model, an audio conditioned latent space indicative of the generated audio data; and transform the audio conditioned latent space to a frequency-spectrogram representing the generated audio data using a decoder.

15. The non-transitory computer-readable medium of claim 13, the audio input condition includes the text condition defined based on a text input string provided as part of the obtained input and an audio condition, wherein the audio condition is associated with the text input string or based on an audio sample.

16. The non-transitory computer-readable medium of claim 13, wherein the multi-conditioned latent diffusion model is at least partly defined as a text to audio generation model conditioned using a plurality of condition including text embedding, audio embedding, and style control condition.

17. The non-transitory computer-readable medium of claim 13, wherein the instructions further cause the one or more hardware computing devices to perform operations including to:

transform a selected original audio data to a latent space provided as an audio sample latent space using the encoder, and change, using the multi-conditioned latent diffusion model, the audio sample latent space based on the audio style condition, wherein the generated audio data is indicative of the selected original audio data and the selected audio style profile.

* * * * *